(12) United States Patent
Fuentes

(10) Patent No.: US 7,208,920 B2
(45) Date of Patent: Apr. 24, 2007

(54) BUCK/BOOST POWER CONVERTER

(75) Inventor: Hugo Jorquera Fuentes, Paris (FR)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 227 days.

(21) Appl. No.: 10/796,615

(22) Filed: Mar. 9, 2004

(65) Prior Publication Data

US 2004/0245966 A1 Dec. 9, 2004

(30) Foreign Application Priority Data

Mar. 11, 2003 (FR) .................... 03 03001

(51) Int. Cl.
*G05F 1/00* (2006.01)
*G05F 1/613* (2006.01)
*G05F 1/656* (2006.01)
*H02M 3/00* (2006.01)
*H02M 3/335* (2006.01)

(52) U.S. Cl. ................ 323/222; 323/223; 323/232; 363/15; 363/16

(58) Field of Classification Search ........... 323/222, 323/223, 232, 233; 363/15, 16
See application file for complete search history.

(56) References Cited

U.S. PATENT DOCUMENTS

| 6,348,781 | B1 * | 2/2002 | Midya et al. ............ 323/224 |
| 6,404,172 | B1 | 6/2002 | May |
| 2002/0011825 | A1 * | 1/2002 | Usui ..................... 323/222 |

FOREIGN PATENT DOCUMENTS

| EP | 0 768 812 A1 | 6/2002 |
| EP | 1 211 791 A1 | 6/2002 |

* cited by examiner

*Primary Examiner*—Gary L. Laxton
*Assistant Examiner*—Richard V. Muralidar
(74) *Attorney, Agent, or Firm*—Cantor Colburn LLP

(57) ABSTRACT

A buck/boost converter having an input and an output, a switching cell with a switch between the input and the output, and a selector selectively configuring the switching cell into at least two configurations from among the following: a parallel chopper configuration, a series chopper configuration, or an inductive-storage chopper configuration, the cell using the same switch in all the configurations. The converter has a single switch for various modes of operation of the converter.

41 Claims, 3 Drawing Sheets

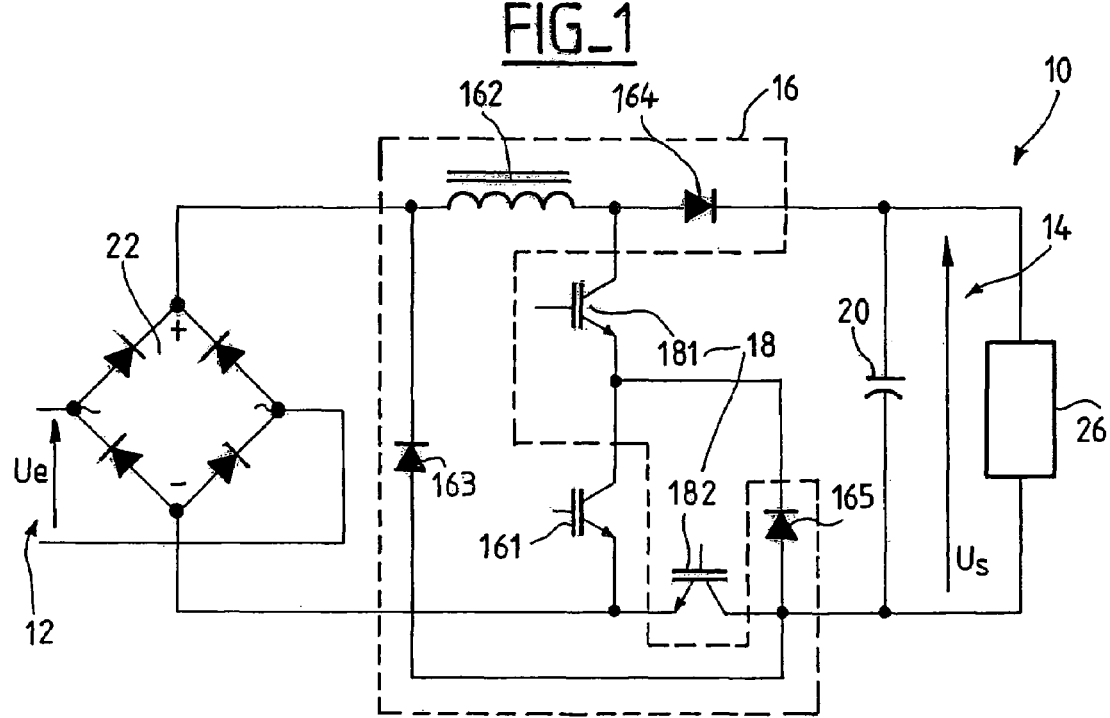
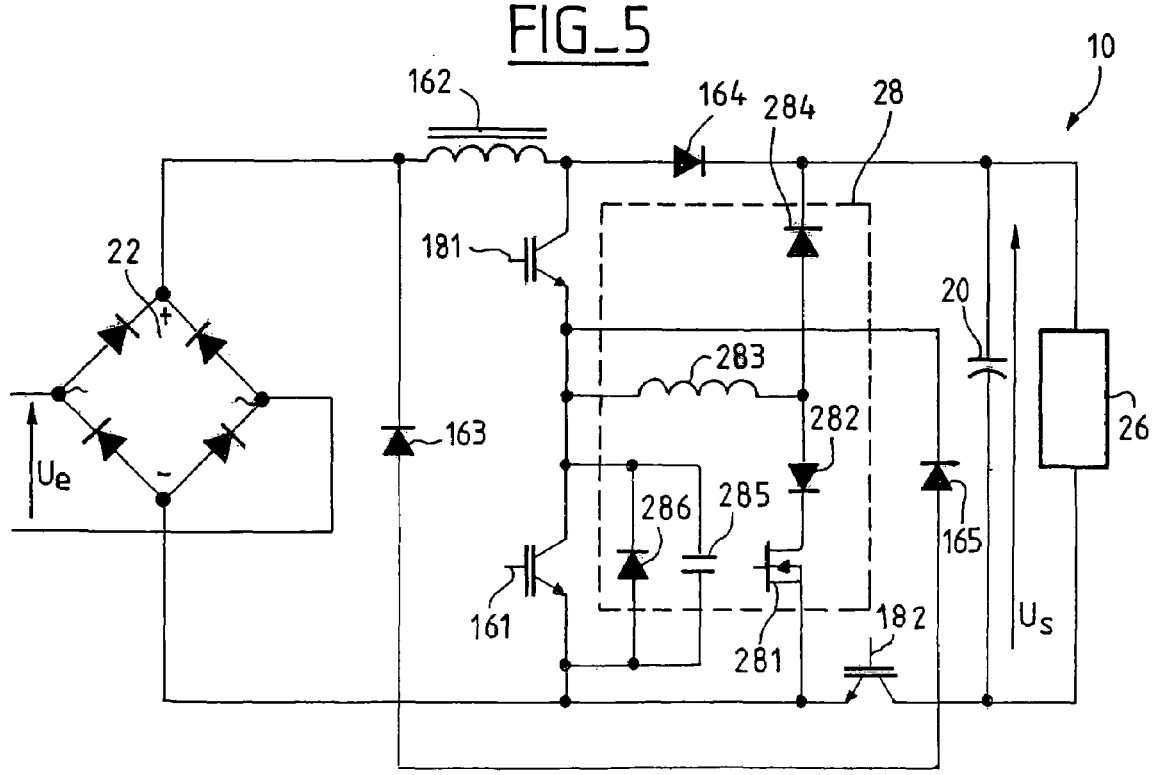

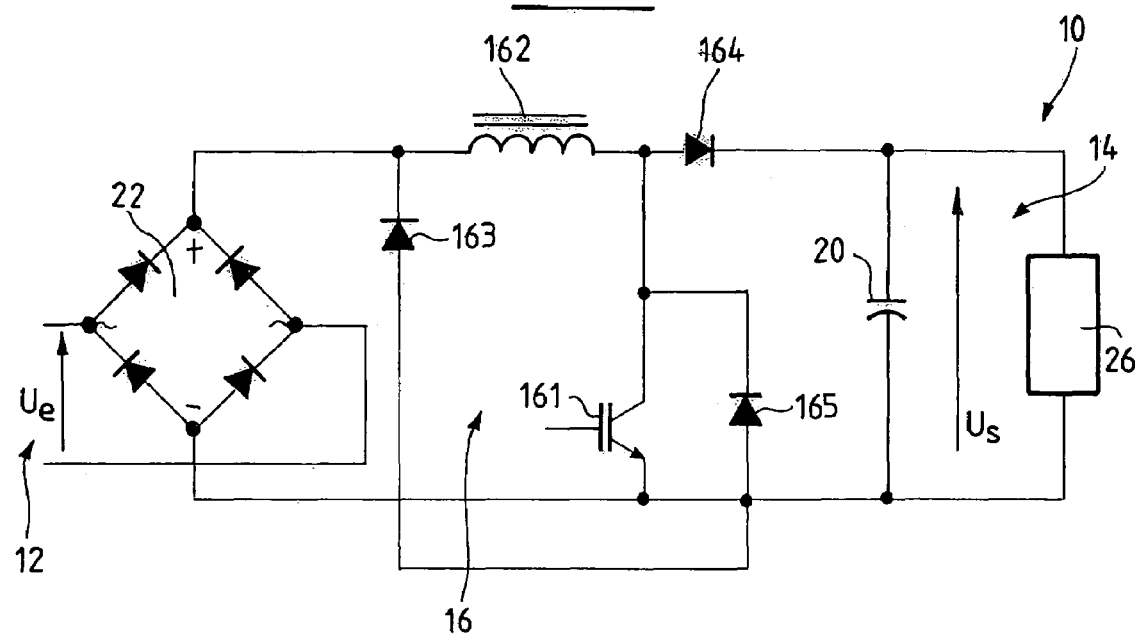
FIG_2
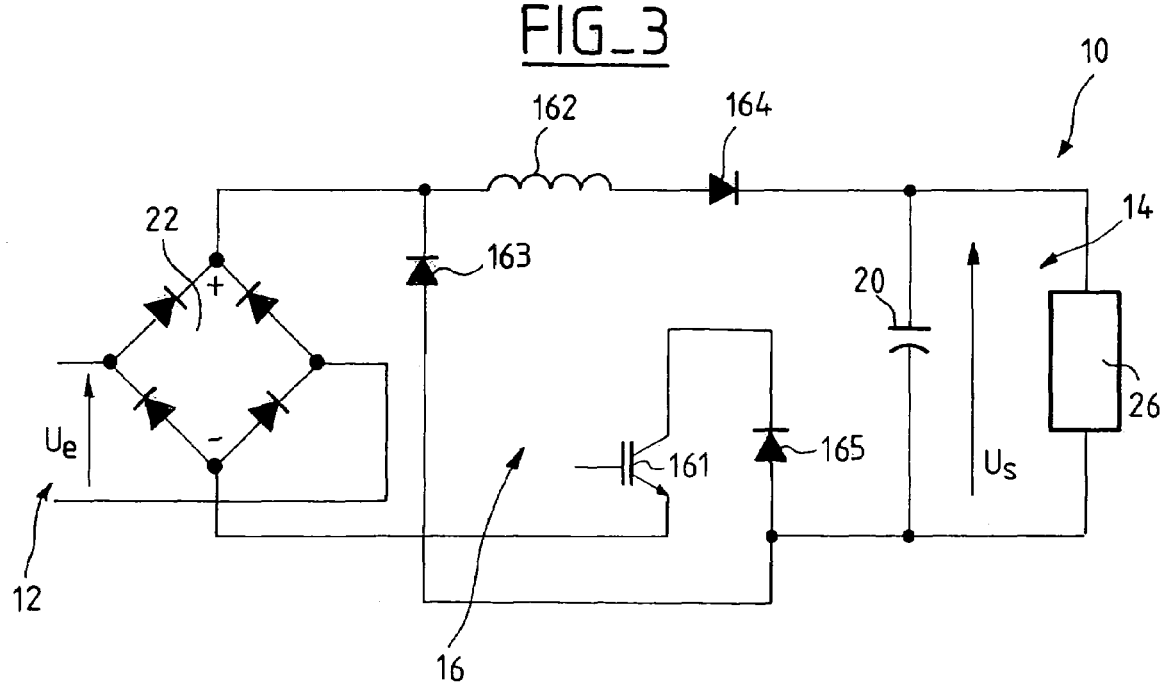
FIG_3

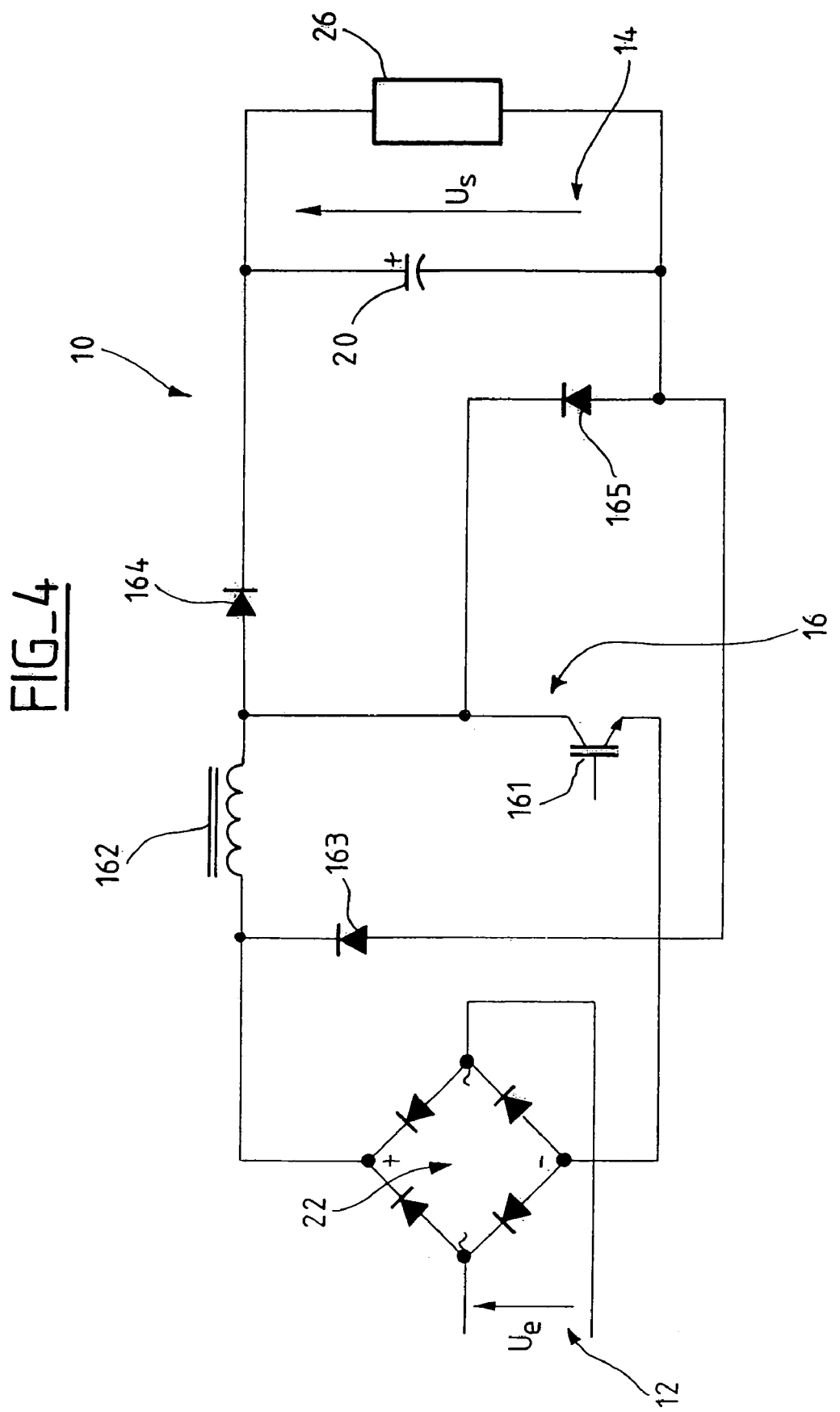
FIG_4

BUCK/BOOST POWER CONVERTER

CROSS-REFERENCE TO RELATED APPLICATIONS

This application claims the benefit of a priority under 35 USC 119(a)–(d) to French Patent Application No. 03 03001 filed Mar. 11, 2003, the entire contents of which are hereby incorporated by reference.

BACKGROUND OF THE INVENTION

The invention relates to a converter of electrical energy or power and more particularly, a buck/boost converter.

In various topologies for converters for voltage step-up/step down and for power factor correction, there currently exist the parallel chopper or "boost" converter, the series chopper or "buck" converter, or the inductive-storage chopper or "buck-boost" converter. Each of these converters has a drawback. In the case of the parallel chopper (boost converter), the voltage at the output is always greater than the voltage applied at the input. In the case of the series chopper (buck converter), the voltage at the output is always less than the voltage applied at the input. In the case of the inductive-storage chopper, although the output voltage may be greater than or less than the voltage applied at the input, the heavy stresses on the components can render it rather unattractive.

U.S. Pat. No. 6,348,781 discloses a hybrid converter operating as a parallel or series chopper, or "buck or boost" converter. A drawback of this converter is that it has a topology in which two transistors carry out the chopping of the voltage, one transistor for each mode of operation. This converter therefore has a complicated and expensive topology.

BRIEF DESCRIPTION OF THE INVENTION

There is therefore a need for a buck/boost converter that is less expensive.

According to an embodiment of the present invention, a buck/boost converter comprises an input and an output, and a switching cell between the input and the output, the cell comprising a switch. The converter also comprises a selector selectively configuring the switching cell into at least two configurations from among the following: a parallel chopper (boost) configuration, a series chopper (buck) configuration, an inductive-storage chopper configuration, the cell using the same switch in all the configurations.

The converter has an advantage of operating according to various modes of operation with an inexpensive construction since the same switch is implemented for each of the modes of operation.

BRIEF DESCRIPTION OF THE DRAWINGS

The invention and embodiments thereof will be better understood from the following description when read together with the drawings, in which:

FIG. 1 shows the topology of the converter according to one embodiment;

FIGS. 2, 3 and 4 show the configuration of the converter of FIG. 1 in various modes of operation; and FIG. 5 shows the topology of the converter of FIG. 1 with a suitable circuit for performing switching.

DETAILED DESCRIPTION OF THE INVENTION

According to an embodiment the buck/boost converter comprises a switching cell with a switch and a selector. The selector can selectively configure the switching cell into at least two configurations from among several. The cell can be configured in the configuration of a parallel chopper (or "boost") circuit. The cell can be configured in the configuration of a series chopper (or "buck") circuit. The cell can also be configured in the configuration of an inductive-storage chopper (or "buck-boost") circuit. Whatever the configuration, the cell uses the same voltage-chopping switch. This makes it less expensive to manufacture the converter. The use of a single switch renders the construction of the converter simpler too. Moreover, by virtue of the hybrid nature of the converter, it is possible to use the converter in various countries with different line or mains voltages. This converter makes it possible to spare the expense of implementing a second converter supplied from a first step-down voltage converter.

FIG. 1 shows a topology of the converter 10 according to one embodiment. The buck/boost converter 10 has an input 12 to which a voltage Ue is applied and an output 14 where the voltage Us is greater than, equal to or less than the voltage Ue. Between the input 12 and the output 14, the converter 10 has a switching cell 16. The switching cell has a switch 161. The configuration of the switching cell varies as a function of a selector 18. The selector 18 selectively configures the cell into at least two configurations from among a series chopper configuration, a parallel chopper configuration, or an inductive-storage chopper configuration. Whatever the configuration selected by the selector 18, the cell 16 uses the switch 161. Thus, the same switch 161 is implemented to chop the voltage Ue applied to the input 12 during operation as a series, parallel or inductive-storage chopper. This makes it possible to reduce the manufacturing costs of the converter 10.

The buck/boost converter 10 provides a voltage Us matched to a load 26. The converter 10 makes it possible to convert one DC voltage into another DC voltage. It is also conceivable for the converter 10 to allow the conversion of an AC voltage into a DC voltage. For this purpose, a rectifier diode bridge 22 can be arranged at the input 14. A diode bridge 22 makes it possible to rectify the voltage Ue. The converter offers a wide range of uses. Specifically, the converter 10 is capable of operating in parallel chopper mode in which the converter provides a voltage Us at the output 14, which is greater than the voltage Ue at the input 12. The converter 10 is also capable of operating in series chopper mode in which the converter provides a voltage Us at the output 14 that is less than the voltage Ue at the input. The converter 10 is also capable of operating in inductive-storage chopper mode in which the converter provides a voltage Us at the output 14 which is greater than, less than or equal to the voltage Ue at the input 12. In this mode of operation, heavy stresses are applied to the components, but the converter allows a transition from the series chopper mode to the parallel chopper mode (or vice versa), while controlling the input current and for a short duration of transition. In particular, the converter 10 is capable of operating in series chopper mode so as to perform controlled start-ups or shutdowns.

The switching cell 16, comprising the switch 161, has the effect of stepping down or stepping up the voltage applied at the input of the converter. The switching cell 16 has a configuration that varies according to a selection performed by the selector 18. The configuration is matched to the mode of operation of the converter. The switching cell 16 comprises the switch 161. The cell 16 uses the same switch in the various modes of operation. The cell furthermore comprises an inductor 162 and diodes 163, 164, 165. The connections between the switch 161, inductor 162 and diodes 163, 164, 165 vary according to the mode of operation of the cell.

The switch 161 may be a transistor, high frequency for example. The transistor is for example a 30 kHz transistor. The choice of a high-frequency transistor allows a reduction in the size of the inductor. The transistor can also be a low-frequency transistor. The high-frequency transistor 161 fulfils the function of regulation of the output voltage and of power factor correction. The switch 161 is periodically switched under the control of a control circuit. The advantage of the converter is that it therefore only calls upon a single high-frequency transistor, and upon a single fast control circuit. This has the effect of rendering the manufacture of the converter less expensive and simpler.

The inductor 162 makes it possible to accumulate energy and the diodes, according to the modes of operation, ensure the continuity of the current in inductor 162 upon the opening of switch 161.

The selector 18 makes it possible to toggle the converter 10 from one mode of operation to the others. The selector 18 is controlled by means of a slow control circuit. The selector comprises for example transistors 181, 182. Transistors 181, 182 may be low-frequency transistors, for example 50 Hz transistors. The advantage of such transistors is that they do not call upon as expensive a control circuit as that for high-frequency transistor. However, transistors 181, 182 may be high-frequency transistors. The selector 18 can move between several positions. By way of non-limiting example, the selector 18 allows a selection between three positions. When the low-frequency transistors 181 and 182 are saturated, this corresponding to closed on/off switches, the converter is in a mode of operation corresponding to that of a parallel chopper. When the low-frequency transistors 181 and 182 are turned off, this corresponding to open on/off switches, the converter is in a mode of operation corresponding to that of a series chopper. When the low-frequency transistor 181 is saturated, this corresponding to a closed on/off switch, and the low-frequency transistor 182 is turned off, this corresponding to an open on/off switch, the converter is in a mode of operation corresponding to that of an inductive-storage chopper.

The choice of the components is very wide but will mainly be dictated by components exhibiting low resistance when conducting.

The topology of the converter 10 will now be described with reference to FIG. 1. The converter comprises an input 12 and an output 14. The voltage Ue is applied to the input 12. The converter 10 may or may not be provided with the voltage rectifier diode bridge 22. The converter 10 comprises a first series arrangement, across the terminals of which the voltage Ue is applied; the series arrangement comprises switch 161, transistor 181 and inductor 162. The inductor 162 has its first terminal connected to the input 12 and its second terminal to transistor 181.

The converter also comprises a second series arrangement comprising transistor 182 and diode 165. The second series arrangement is arranged in parallel with switch 161. The anode of diode 165 is connected to transistor 182 and the cathode of diode 165 is connected to the junction between transistor 181 and switch 161.

Diode 163 has its anode connected to the anode of diode 165 and its cathode connected to the first terminal of inductor 162. Diode 164 has its anode connected to the second terminal of inductor 162, that is to say to the link between inductor 162 and transistor 181, and its cathode connected to the output 14.

The voltage Us at the output 14 is tapped off between the cathode of diode 164 and the junction between diode 165 and transistor 182.

The converter can also comprise a capacitor 20 for filtering the voltage at the output 14. The capacitor can be arranged in parallel with the series arrangement comprising diode 165, transistor 181 and diode 164. The voltage Us is tapped off at the terminals of capacitor 20.

The operation of the converter will now be presented in conjunction with FIGS. 2, 3 and 4. FIGS. 2 to 4 shows the configuration of the converter of FIG. 1 in various modes of operation.

FIG. 2 shows the converter of FIG. 1 operating as a parallel chopper (or boost circuit). The selector 18 is in a first position. In an embodiment of selector 18 in the form of transistors 181 and 182, the transistors are saturated, achieving the function of closed on/off switches. In this position of the selector, the switching cell 16 has a configuration of a parallel chopper, or one that is equivalent to that of a parallel chopper; the cell 16 fulfils a function of stepping up the voltage Ue into a greater voltage Us. The cell 16 then has the components, viz. inductor 162, switch 161 and diode 164 which are connected together in a star. Through simple selection of the selector 18, these components are connected together so as to give the cell, and in a general manner the converter, the configuration of a parallel chopper.

In FIG. 2, the voltage Ue applied to the input 12 is applied to the terminals of a series arrangement comprising inductor 162 and switch 161. The switch 161 is connected to the second terminal of inductor 162. A diode 164 is connected by its anode to the junction between the second terminal of inductor 162 and switch 161. Diode 164 is connected by its cathode to the output 14. Diode 164, inductor 162 and switch 161 are connected in a star. The capacitor 20 can be connected in parallel to switch 161 and diode 164 series arrangement.

Diode 165 is in parallel with switch 161, the cathode being connected to the central node of the star wiring of diode 164, inductor 162 and switch 161. Diode 165 is not in conduction mode, either because it is short-circuited by switch 161 when the latter conducts, or because it is turned off when switch 161 opens. Diode 163 is connected on the one hand by its anode to the junction between diode 165 and switch 161 and on the other hand to the first terminal of inductor 162. It is always reverse-biased to off by the voltage Ve, hence it can never start conducting.

The operation of the converter 10 in this mode of selection of the selector is as follows. The switch is periodically switched according to the orders of a control circuit (not shown). The switch has the function of an open or closed on/off switch. A rectangular voltage signal applied to the terminals of inductor 162 is obtained. This voltage signal defines the current passing through inductor 162, whose average value can be adjusted by varying the switching durations. The capacitor 20 makes it possible to store the energy of this current and to filter the voltage Us. Diode 164 has the effect of ensuring the continuity of the current in the inductor upon the opening of the switch. When the switch is closed (this corresponding to a saturated transistor), the current increases and the inductor stores up energy. When the switch is open (this corresponding to a turned-off transistor), the current in inductor 162 flows into diode 164, which instantaneously becomes conducting.

In the parallel chopper mode, the converter exhibits advantages by comparison with the converter of U.S. Pat. No. 6,348,781, in terms of reliability. Specifically, for these two converters operating in parallel chopper mode ("boost" mode), the "buck switch" transistor of U.S. Pat. No. 6,348, 781 (hereinafter "buck transistor") and the low-frequency transistors 181, 182 of the converter 10 have the same function. In parallel chopper mode, all three of them are equivalent to a closed on/off switch, fully conducting, but experience different currents. The effective current through buck transistor is around $\sqrt{2}$ times higher than the current in transistors 181 and 182. This puts a constraint on the choice of the buck transistor. More precisely, for a given operating point, the currents in the transistors are as follows: $I_{rms\_transistor\_buck}^2 = I_{rms\_181}^2 + I_{rms\_182}^2$. Assuming that the criterion of low resistance is disregarded and that the three components have the same resistance, then the losses will be the same. However, the losses in the converter will be distributed over the two transistors 181 and 182 instead of being concentrated on the same buck transistor. In terms of reliability, the converter 10 is therefore more beneficial.

FIG. 3 shows the converter of FIG. 1 operating as a series (or "buck") chopper. The selector 18 is in a second position. In an embodiment of the selector 18 in the form of transistors 181 and 182, the transistors are turned off, achieving the function of open on/off switches. In this position of the selector, the switching cell 16 has a configuration of a series chopper, or one which is equivalent to that of a series chopper; the cell 16 fulfils a function of stepping down the voltage Ue into a lower voltage Us. Through simple selection of the selector 18, the cell, and in a manner general to the converter, has the configuration of a series chopper. In this second mode of operation, the converter steps down the voltage applied to the input by implementing the same switch 161 as in the previous case.

In FIG. 3, the voltage Ue applied to the input 12 is applied to the terminals of a series arrangement comprising diode 163, diode 165 and switch 161. Diode 163 has its anode connected to the anode of diode 165. Diode 165 has its cathode connected to switch 161. One end of inductor 162 is connected to the cathode of diode 163. The other end of inductor 162 is connected to the anode of diode 164. Diode 164 has its cathode connected to the output 14. The capacitor 20 may be connected in parallel with the series arrangement comprising diode 163, inductor 162 and diode 164.

Diode 165 is part of the series arrangement comprising switch 161 and diode 163. Diode 165 is forward-biased and is in series with switch 161. Due to the operation of the circuit in series chopper mode, diode 165 is always positive biased, that is to say, always in a conducting state even if no current is passing through it, since it is the switch that turns off the current and endures the switching operations. One end of diode 164 is connected to inductor 162 by its anode and the other end to the output 14. Diode 164 is in series with inductor 162. The inductor 162 can conduct in one direction only, from the input 12 to the output 14, corresponding to the forward direction of the diode. Thus diode 164 will be conducting if inductor 162 is conducting.

The operation of the converter 10 in this mode of selection of the selector is as follows. The switch is periodically switched under the control of a control circuit (not shown). The switch has the function of an open or closed on/off switch. The switch chops the input signal. A rectangular voltage signal applied to the terminals of inductor 162 is obtained. This voltage signal defines the current passing through inductor 162, the mean value of which may be adjusted by varying the switching durations. The capacitor 20 makes it possible to store the energy of this current and to filter the voltage Us. Diode 163 has the effect of ensuring the continuity of the current in the inductor upon the opening of the switch. When the switch is closed (this corresponding to a saturated transistor), the current increases and the inductor stores up energy. When the switch is open (this corresponding to a turned-off transistor), the current in inductor 162 flows into diode 163, which instantaneously becomes conducting.

FIG. 4 shows the converter of FIG. 1 operating as an inductive-storage (or "buck-boost") chopper. The selector is in a third position. In an embodiment of the selector 18 in the form of transistors 181 and 182, transistor 181 is saturated, this corresponding to a closed on/off switch, and transistor 182 is off, this corresponding to an open on/off switch.

In FIG. 4, the voltage Ue applied to the input 12 is applied to the terminals of a series arrangement comprising inductor 162 and switch 161. Switch 161 is connected to the second terminal of inductor 162. Diode 164 is connected by its anode to the junction between the second terminal of inductor 162 and switch 161. Diode 164 is connected by its cathode to the output 14. Diode 164, inductor 162 and switch 161 are connected in a star arrangement. The cathode of diode 165 is connected to the central node of the star network comprising diode 164, inductor 162 and switch 161. Diode 165 is connected by its anode to the output 14. In this embodiment, diode 165 is always off since when diode 164 conducts, diode 165 is reverse-biased to a voltage equal to Us and when diode 164 is off, the two diodes share the reverse-bias voltage Us. One terminal of diode 163 is connected to the anode of diode 165 and the other to the first terminal of inductor 162. The capacitor 20 can be connected in parallel with the series arrangement of diode 165 and diode 164.

The operation of the converter 10 in this mode of selection of the selector is as follows. The switch is periodically switched under the control of a control circuit (not shown). The switch has the function of an open or closed on/off switch. A rectangular voltage signal applied to the terminals of inductor 162 is obtained. This voltage signal defines the current passing through inductor 162, the mean value of which may be adjusted by varying the switching durations. The capacitor 20 makes it possible to store the energy of this current and to filter the voltage Us. Diode 163 has the effect of ensuring the continuity of the current in the inductor upon the opening of the switch. When switch 161 is closed (this corresponding to a saturated transistor), the current increases and the inductor stores up energy. When switch 161 is open (this corresponding to a turned-off transistor), the current in inductor 162 flows into diode 163, which instantaneously becomes conducting.

According to one embodiment, the selector 18 selectively configures the switching cell 16 among the three configurations described with reference to FIGS. 2 to 4. The advantage is to be able to operate the converter according to various modes of operation while using just a single switch 161. This renders the converter less expensive. In inductive-storage chopper mode, the converter 10 allows a transition from the series chopper mode to the parallel chopper mode (or vice versa), while controlling the input current.

FIG. 5 shows the topology of the converter of FIG. 1 with a switching aid circuit 28. The switching aid circuit 28 is given by way of example and is not limited to the latter. The switching aid circuit 28 assists the switching of switch 161 and reduces the overvoltage in the switch when the latter is opened. The switching aid circuit 28 also assists the switching of diode 164 in the parallel chopper mode, and diode 163 in the series chopper or inductive-storage chopper modes.

The switching aid circuit 28 comprises a series arrangement comprising an on/off switch 281, a diode 282 and an inductor 283, this series arrangement being in parallel with switch 161. Diode 282 is connected by its cathode to the on/off switch 281 and by its anode to inductor 283. The switching aid circuit 28 also comprises a diode 284 with its anode connected to the junction between inductor 283 and diode 282 and its other terminal connected to the cathode of diode 164. The switching aid circuit 28 also comprises a diode 286 and a capacitor 285 both in parallel with switch 161. The turning on of the on/off switch 281 allows a linear and controlled rise of the current passing through inductor 283. When this current reaches a sufficient level, it will allow a gentle turning off of the current passing through diode 164 (if it is in parallel chopper mode) or diode 163 (if it is in series or inductive-storage chopper mode). Thereupon inductor 283 comes into resonance with the capacitor 285 in parallel with switch 161. Consequently, the voltage in switch 161 reaches zero just before it turns on the switch, thereby resulting in gentle switching of the switch. A diode 286 in parallel with switch 161 and with the capacitor 285 avoids reversing the voltage across the terminals of switch 161 (which is dangerous). Diode 286 also makes it possible to ensure the continuity of the current resulting from this resonance. Once the voltage across the terminals of switch 161 is at zero, the on/off switch 281 can be closed (made to conduct), and then the on/off switch 281 can be opened forthwith. The current stored up in inductor 283 will flow via diode 284 to the output.

The advantage of the converter is that it calls upon only a switching aid circuit to protect switch 161. This simplifies the arrangement and makes it cheaper.

The disclosed embodiments of a converter is not strictly limited to the topologies described but extends also to symmetric topologies or to topologies in which other components may be interposed between the components described. Also, the inductor can be replaced by a transformer. Moreover, the combinations of configurations can be considered independently of one another.

One skilled in the art may make or propose various modifications in the structure/way and/or function and/or result of the disclosed embodiments without departing from the scope and extant of the invention.

What is claimed is:

1. A buck/boost converter comprising:
   an input and an output;
   a switching cell with a switch between the input and the output;
   a selector configured for selectively configuring the switching cell into at least two configurations from among the following:
     a parallel chopper configuration or
     a series chopper configuration or;
     an inductive-storage chopper configuration;
   wherein the switch is configured to chop a voltage of the input in the at least two configurations.

2. The converter according to claim 1 wherein the selector is configured to selectively configure the switching cell from among the three configurations.

3. The converter according to claim 1 wherein the switching cell comprises an inductor and diodes.

4. The converter according to claim 2 wherein the switching cell comprises an inductor and diodes.

5. The converter according to claim 1 wherein the switch is a transistor.

6. The converter according to claim 2 wherein the switch is a transistor.

7. The converter according to claim 3 wherein the switch is a transistor.

8. The converter according to claim 4 wherein the switch is a transistor.

9. The converter according to claim 5 wherein the switch is a high-frequency transistor, for example, 30 kHz.

10. The converter according to claim 1 wherein the selector comprises a first transistor and a second transistor.

11. The converter according to claim 2 wherein the selector comprises a first transistor and a second transistor.

12. The converter according to claim 3 wherein the selector comprises a first transistor and a second transistor.

13. The converter according to claim 5 wherein the selector comprises a first transistor and a second transistor.

14. The converter according to claim 9 wherein the selector comprises a first transistor and a second transistor.

15. The converter according to claim 10 wherein the selector comprises two transistors of a low-frequency, for example, 50 kHz.

16. The converter according to claim 10 wherein in response to the converter operating in the parallel chopper configuration, the transistors are both continuously conducting.

17. The converter according to claim 11 wherein in response to the converter operating in the parallel chopper configuration, the transistors are both continuously conducting.

18. The converter according to claim 12 wherein in response to the converter operating in the parallel chopper configuration, the transistors are both continuously conducting.

19. The converter according to claim 13 wherein in response to the converter operating in the parallel chopper configuration, the transistors are both continuously conducting.

20. The converter according to claim 14 wherein in response to the converter operating in the parallel chopper configuration, the transistors are both continuously conducting.

21. The converter according to claim 15 wherein in response to the converter operating in the parallel chopper configuration, the transistors are both continuously conducting.

22. The converter according to claim 10 wherein in response to the converter operating in the series chopper configuration, the transistors are both continuously non-conducting.

23. The converter according to claim 11 wherein in response to the converter operating in the series chopper configuration, the transistors are both continuously non-conducting.

24. The converter according to claim 12 wherein in response to the converter operating in the series chopper configuration, the transistors are both continuously non-conducting.

25. The converter according to claim 13 wherein in response to the converter operating in the series chopper configuration, the transistors are both continuously non-conducting.

26. The converter according to claim 14 wherein in response to the converter operating in the series chopper configuration, the transistors are both continuously non-conducting.

27. The converter according to claim 15 wherein in response to the converter operating in the series chopper configuration, the transistors are both continuously non-conducting.

28. The converter according to claim 10 wherein in response to the converter operating in the inductive-storage chopper configuration, the first transistor is continuously conducting and the second transistor is continuously non-conducting.

29. The converter according to claim 11 wherein in response to the converter operating in the inductive-storage chopper configuration, the first transistor is continuously conducting and the second transistor is continuously non-conducting.

30. The converter according to claim 12 wherein in response to the converter operating in the inductive-storage chopper configuration, the first transistor is continuously conducting and the second transistor is continuously non-conducting.

31. The converter according to claim 13 wherein in response to the converter operating in the inductive-storage chopper configuration, the first transistor is continuously conducting and the second transistor is continuously non-conducting.

32. The converter according to claim 14 wherein in response to the converter operating in the inductive-storage chopper configuration, the first transistor is continuously conducting and the second transistor is continuously non-conducting.

33. The converter according to claim 15 wherein in response to the converter operating in the inductive-storage chopper configuration, the first transistor is continuously conducting and the second transistor is continuously non-conducting.

34. The converter according to claim 1 comprising a capacitor for filtering the voltage at the output.

35. The converter according to claim 1 comprising a diode bridge at the input.

36. The converter according to claim 1 wherein the switch is configured to chop a voltage of the input in each of the parallel chopper configuration, the series chopper configuration, and the inductive-storage chopper configuration.

37. The converter according to claim 1, wherein:
in response to the selector configuring the switching cell into any one of the parallel chopper configuration, the series chopper configuration, or the inductive-storage chopper configuration, the switch is configured to periodically switch between on and off conditions.

38. The converter according to claim 16, wherein:
in response to the selector configuring the switching cell into the parallel chopper configuration, the switch is configured to periodically switch between on and off conditions.

39. The converter according to claim 22, wherein:
in response to the selector configuring the switching cell into the series chopper configuration, the switch is configured to periodically switch between on and off conditions.

40. The converter according to claim 28, wherein:
in response to the selector configuring the switching cell into the inductive-storage chopper configuration, the switch is configured to periodically switch between on and off conditions.

41. A buck/boost converter comprising:
an input and an output;
a switching cell with a switch between the input and the output;
a selector configured for selectively configuring the switching cell into a parallel chopper configuration, a series chopper configuration, or an inductive-storage chopper configuration;
wherein the selector comprises a first means for switching and a second means for switching;
wherein in response to the converter operating in the parallel chopper configuration, the first and second means for switching are both continuously conducting;
wherein in response to the converter operating in the series chopper configuration, the first and second means for switching are both continuously non-conducting;
wherein in response to the converter operating in the inductive-storage chopper configuration, the first means for switching is continuously conducting and the second means for switching is continuously non-conducting; and
in response to the converter operating in any one of the parallel chopper configuration, the series chopper configuration, or the inductive-storage chopper configuration, the switch is configured to periodically switch between on and off conditions.

* * * * *